(12) United States Patent
Lin

(10) Patent No.: US 7,207,877 B1
(45) Date of Patent: Apr. 24, 2007

(54) CLAMP-TYPE OPTICAL DISC REPAIRING DEVICE

(76) Inventor: Mao-Sang Lin, 6F-2, No. 1, Zhong-an St., Xinzhuang City, Taipei County (TW)

( * ) Notice: Subject to any disclaimer, the term of this patent is extended or adjusted under 35 U.S.C. 154(b) by 35 days.

(21) Appl. No.: 11/450,302

(22) Filed: Jun. 12, 2006

(51) Int. Cl.
*B24D 15/00* (2006.01)

(52) U.S. Cl. .................. 451/523; 541/514; 541/517

(58) Field of Classification Search ............. 451/523, 451/524, 514–520, 522, 365, 63
See application file for complete search history.

(56) References Cited

U.S. PATENT DOCUMENTS

| | | | | |
|---|---|---|---|---|
| 4,713,856 A | * | 12/1987 | Clausen | 15/97.1 |
| 4,783,870 A | * | 11/1988 | Yeung | 15/97.1 |
| 5,423,103 A | | 6/1995 | Born | |
| 5,584,089 A | * | 12/1996 | Huang | 15/97.1 |
| 5,964,650 A | | 10/1999 | Born et al. | |
| 6,590,847 B2 | * | 7/2003 | Weng | 369/72 |
| 6,699,110 B2 | * | 3/2004 | Lee | 451/242 |
| 6,717,900 B2 | * | 4/2004 | Weng | 369/72 |
| 6,960,122 B2 | * | 11/2005 | Lin | 451/285 |
| 2002/0129455 A1 | * | 9/2002 | Wei | 15/102 |
| 2005/0223509 A1 | * | 10/2005 | Hanninen | 15/97.1 |

* cited by examiner

*Primary Examiner*—Dung Van Nguyen
(74) *Attorney, Agent, or Firm*—Birch, Stewart, Kolasch & Birch, LLP

(57) ABSTRACT

A clamp-type optical disc repairing device is used to clamp an optical disc with a central hole and swab or repair the optical disc, and comprises: a first clamp arm; and a second clamp arm, pivotally coupled to the first clamp arm. Force-applying ends are defined on the pivotal connection positions of the first and the second clamp arms, and clamping ends are defined on the ends opposite to the force-applying ends. The inner side of the clamping end has a positioning convex member, and the inner side of the force-applying ends has an elastic element. The inner wall of the first clamp arm or the second clamp arm has at least one contact pad. After the positioning convex member has penetrated through the central hole of the optical disc and the clamp arms have clamped the optical disc well, the user can apply force to rotate the optical disc.

9 Claims, 6 Drawing Sheets

_US 7,207,877 B1_

CLAMP-TYPE OPTICAL DISC REPAIRING DEVICE

FIELD OF THE INVENTION

The present invention relates to an optical disc repairing device, particularly to a clamp-type optical disc repairing device, which utilizes a first clamp arm and a second clamp arm to clamp the optical disc and then swabs or repairs the optical disc.

BACKGROUND OF THE INVENTION

Since CD (Compact Disc) appeared, it has rapidly replaced the traditional phonograph disc and audiotape. Succeeding to CD, VCD (Video Compact Disc) also appeared, and VCD has also replaced the traditional videotape. Currently, CD-ROM (Compact Disc Random only Memory) and DVD (Digital Video Compact Disc) are also very popular. The abovementioned optical discs all have smooth readable surfaces. When the user cleans or swabs the readable surface, the readable surface is apt to be scratched. Besides, when the user holds, uses or places an optical disc, its readable surface is also likely to be damaged. When laser light illuminates the scratched readable surface, abnormal refraction of laser light will occur, and thus, the data cannot be read correctly. The scratched optical discs may be the music discs or the movie discs, which have been out of print, or may store very important data. If those optical discs cannot be repaired, the loss is hard to compensate.

To solve the abovementioned problem, U.S. Pat. No. 5,423,103 and No.5964650 propose related technologies to repair optical discs. In both conventional technologies, an elastic grinding wheel, which is disposed in the direction vertical to the optical disc, is pressed with force onto the readable surface of the optical disc. Thus, the elastic grinding wheel will be deformed to contact the readable surface, and the readable surface is ground thereby. The grinding wheel has to span the optical; thus, the diameter of the grinding wheel has to be greater than that of the optical disc. Further, the grinding wheel has to be vertical to the optical. Therefore, the volume of the entire grinding device is too large to be carried about or stored up. Besides, the price of those grinding devices is very high. Thus, they are not suitable for common users.

SUMMARY OF THE INVENTION

The present invention provides a clamp-type optical disc repairing device, which can swab and repair the surface of an optical disc via an easy operation and has a simple structure and a smaller size so that the user can carry it about and use it conveniently.

To achieve the abovementioned objective, the clamp-type optical disc repairing device of the present invention comprises: a first clamp arm; and a second clamp arm, pivotally coupled to the first clamp arm. Force-applying ends are defined on the pivotal connection positions of the first clamp arm and the second clamp arm, and clamping ends are defined on the ends opposite to the force-applying ends. The inner side of the clamping end has a positioning convex member, and the inner side of the force-applying ends has an elastic element. The inner wall of the first clamp arm or the second clamp arm has at least one contact pad. The inner sides of the force-applying ends are compressed by the elastic element so that the clamping ends are normally closed. When an external is applied to the force-applying ends, the clamping ends are opened to form an open angle so that the optical disc can be placed in or taken out from the disposing space between the first clamp arm and the second clamp arm. The positioning convex member penetrates through the central hole of the optical disc, and the contact pad contacts the surface of the optical disc. Thereby, the present invention is advantaged in its simple structure and superior portability, and users can carry about the device of the present invention conveniently; thus, they can swab or repair optical discs anywhere and anytime.

DETAILED DESCRIPTION OF THE PREFERRED EMBODIMENTS

The detailed description and technical contents of the present invention are to be stated in cooperation with the drawings below.

Figure 1:
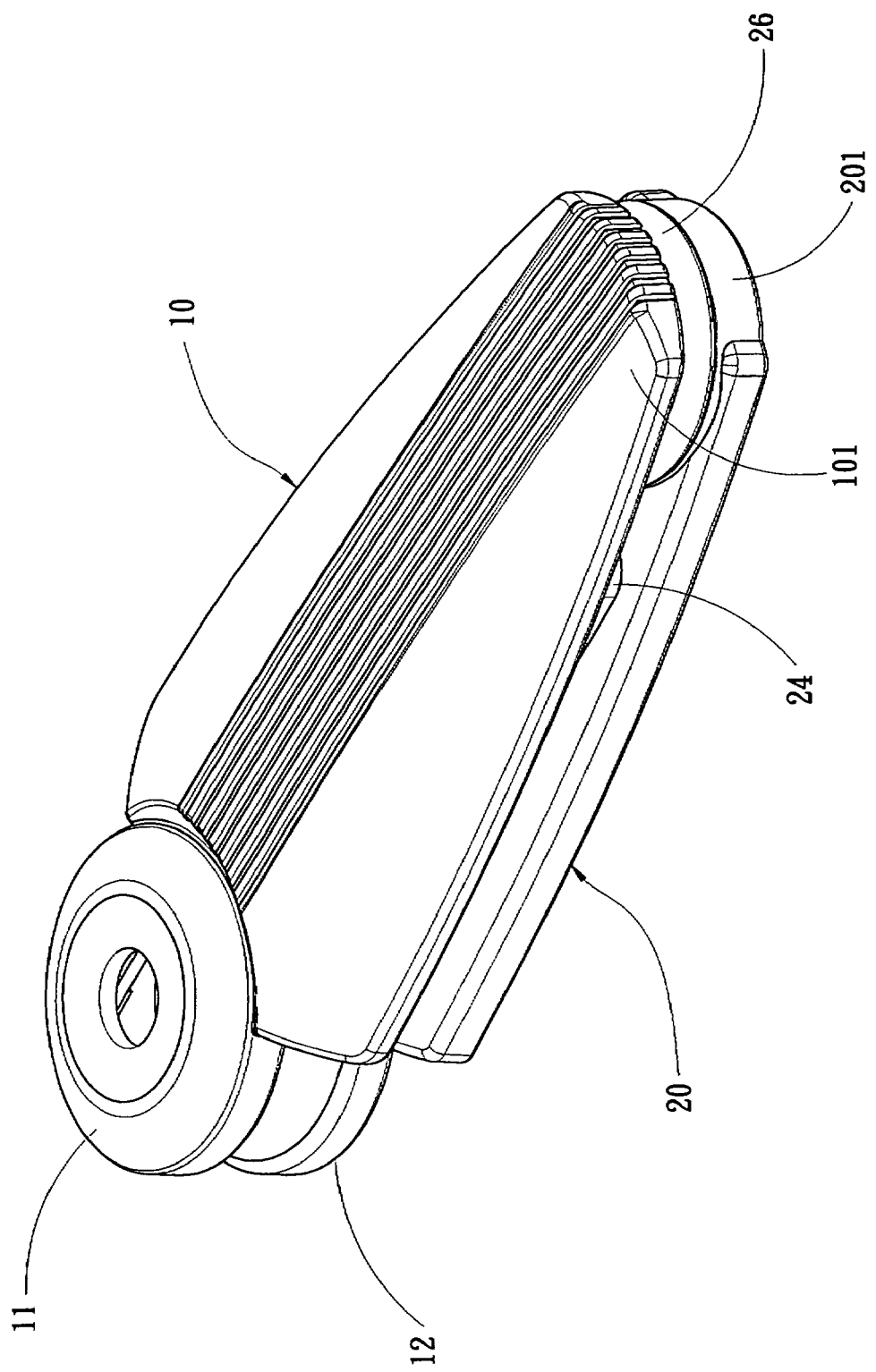
FIG. 1 is a diagram schematically showing the structure of the clamp-type optical disc repairing device according to a first preferred embodiment of the present invention.
Figure 2:
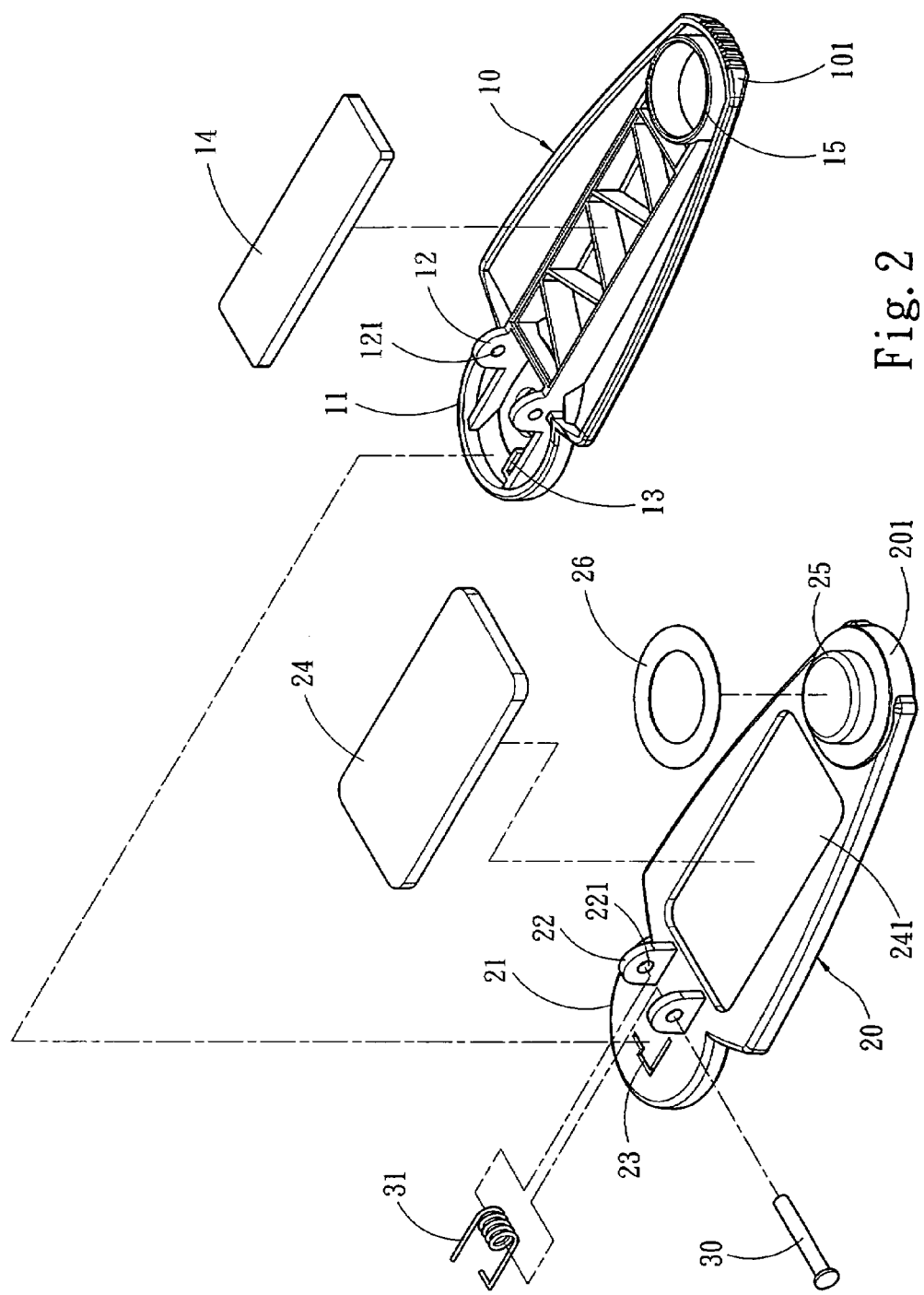
FIG. 2 is a diagram schematically showing the structure of the clamp-type optical disc repairing device according to the first preferred embodiment of the present invention.

Refer to FIG. 1 and FIG. 2 diagrams schematically showing the structure of the clamp-type optical disc repairing device according to a first preferred embodiment of the present invention. The clamp-type optical disc repairing device of the present invention is used to clamp an optical disc 1 with a central hole 2 and then swab or repair the surface of the optical disc 1. The clamp-type optical disc repairing device of the present invention comprises: a first clamp arm 10; and a second clamp arm 20, pivotally coupled to the first clamp arm 10. A first pivotal element 12 is installed to the first clamp arm 10, and a second pivotal 22 is installed to the second clamp arm 20. The first pivotal element 12 has pivotal holes 121, and the second pivotal element 22 has pivotal holes 221, and a pivotal pin 30 is inserted into the pivotal holes 121 and 221 to form a pivotal connection relationship between the first clamp arm 10 and the second clamp arm 20. Force-applying ends 11 and 21 are defined on the pivotal connection positions, and clamping ends 101 and 201 are defined on the ends opposite to the force-applying ends 11 and 21. An elastic element 31 is installed in the pivotal pin 30, and the elastic element 31 may be a spring. The first and second clamp arms 10 and 20 respectively have accommodation slots 13 and 23 in the inner sides of the force-applying ends 11 and 21, and the accommodation slots 13 and 23 are used to accommodate the elastic element 31. The inner side of the first clamp arm 10 has at least one contact pad 14, and the inner side of the second clamp arm 20 has at least one contact pad 24. The inner side of the clamping end 201 has a positioning convex member 25, and the inner side of the first clamp arm 10 has an empty accommodation member 15, and the positioning convex member 25 can be inserted into the empty accommodation member 15. The inner side of the second clamp arm 20 has a basin 241 to accommodate the contact pad 24. A washer 26 is installed along the perimeter of the positioning convex member 25.

Figure 3A:
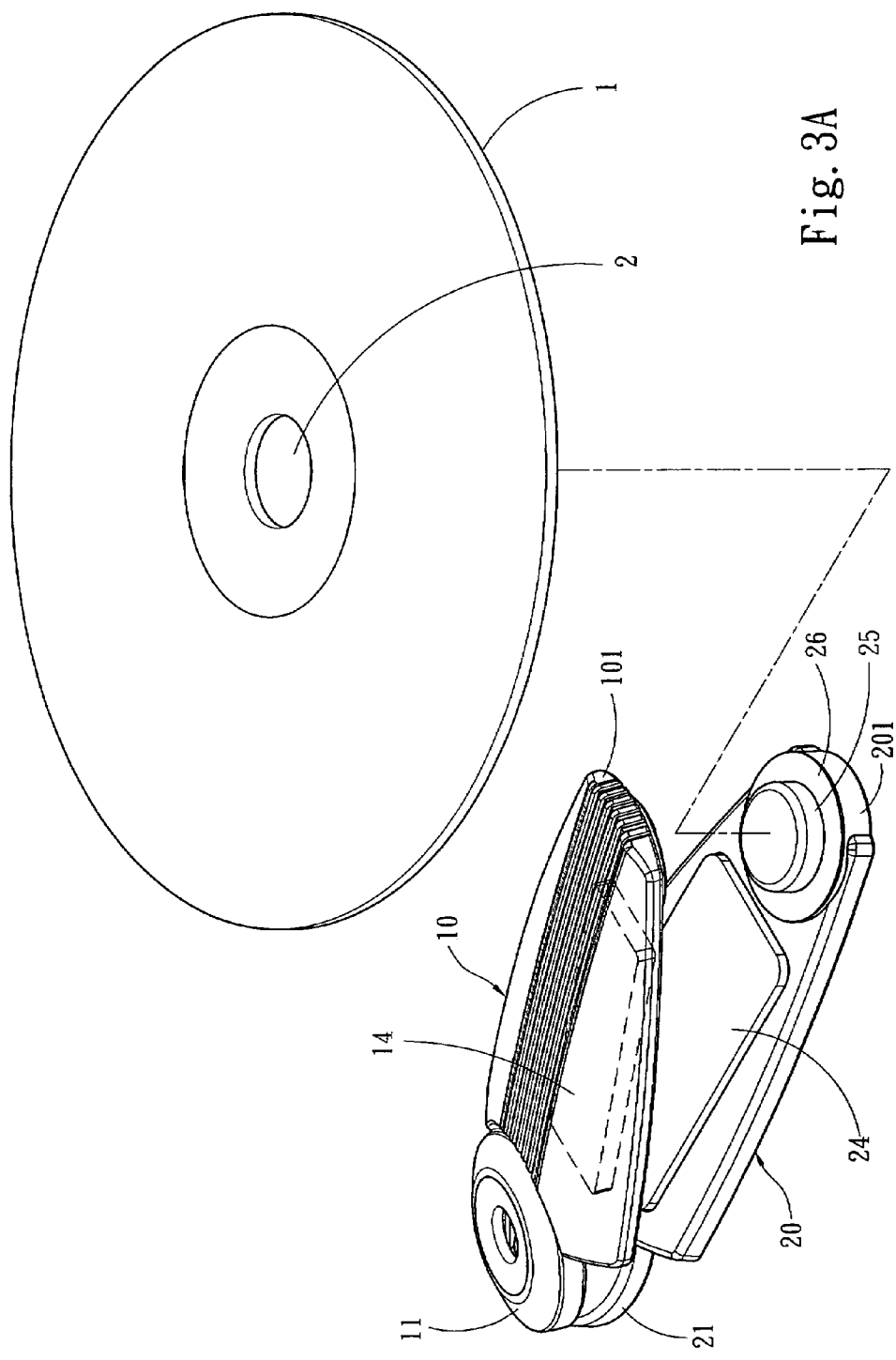
FIG. 3A to FIG. 3C are diagrams schematically showing the operation of the clamp-type optical disc repairing device according to the first preferred embodiment of the present invention.
Figure 3B:
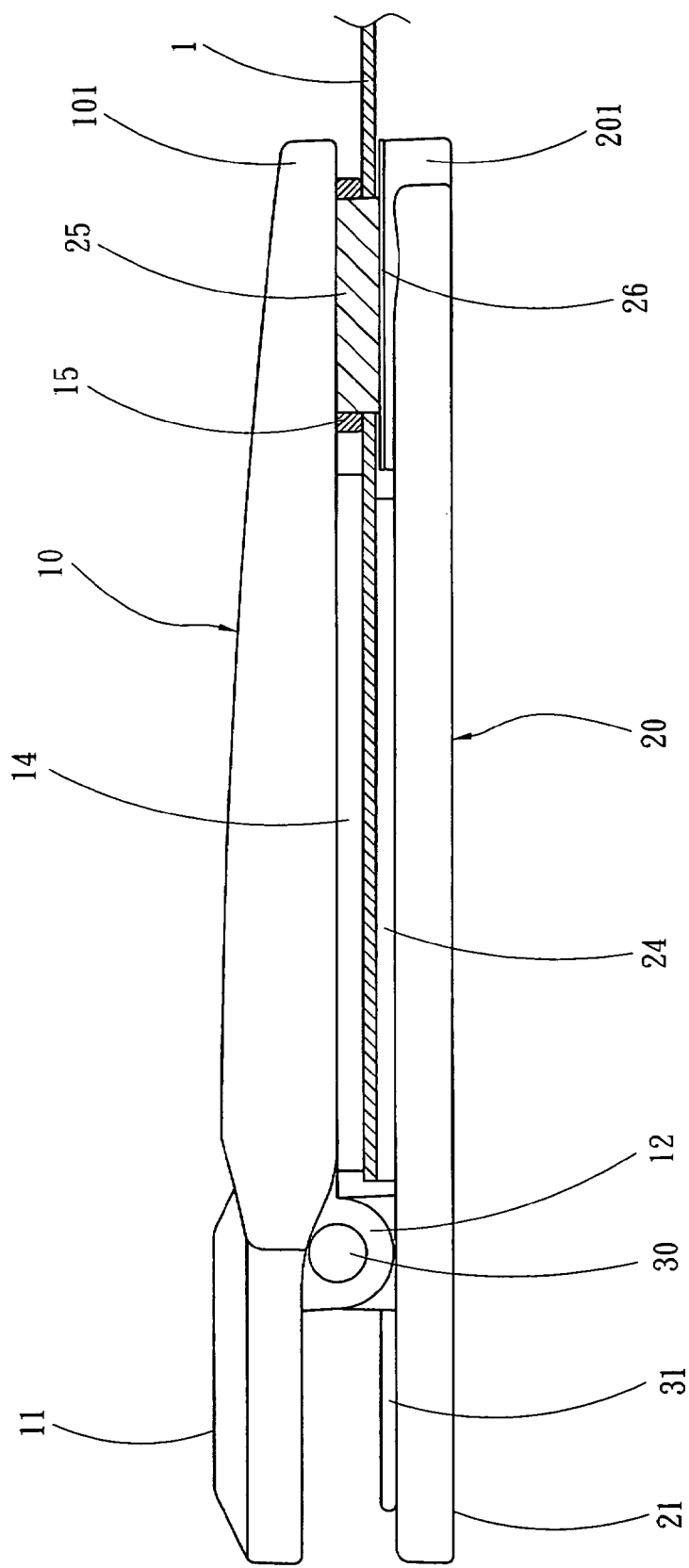
Figure 3C:
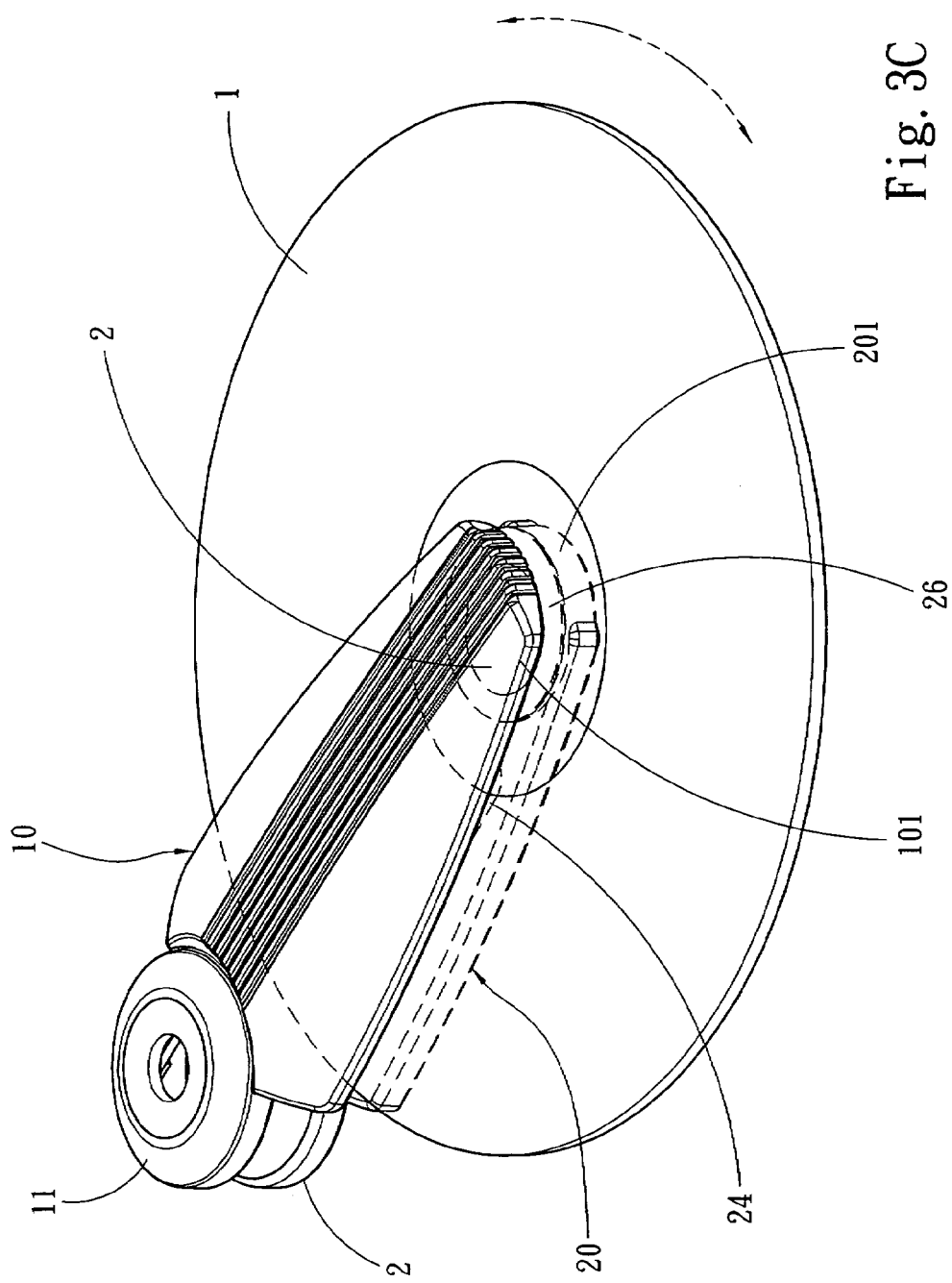

Refer to from FIG. 3A to FIG. 3C diagrams schematically showing the operation of the clamp-type optical disc repairing device according to the first preferred embodiment of the present invention. When the user intends to repair the optical disc 1, he should apply a repair liquid onto the contact pad 14 or 24. If the user just intends to swab the optical disc 1, the repair liquid-applying step is unnecessary. As shown in FIG. 3A, via applying force to the force-applying ends 11 and 21 with hands, the first and second clamp arms 10 and 20 are pivotally opened from the pivotal pin 30 to form an open angle, and the elastic element 31 is also compressed to store an elastic energy. The optical disc 1 is placed in the disposing space between the clamp arms 10 and 20. As shown in FIG. 3B, when the positioning convex member 25 penetrates through the central hole 2 of the optical disc 1, force is no more applied to the force-applying ends 11 and 21, and the restoring force of the elastic element 31 restore the clamp arms 10 and 20 to a closed state, and the positioning convex member 25, which has penetrated through the central hole 2 of the optical disc 1, is further inserted into the empty accommodation member 15, and thus, the optical disc 1 is positioned fixedly and closely contacts the contact pad 24. After the clamp arms 10 and 20 have clamped the optical disc 1 well, the user can apply force to rotate the optical disc 1 with respect to the central hole 2. As the contact pads 14 and 24 contact the surface of the optical disc 1 closely, the surface of the optical disc 1 will be swabbed or repaired during the rotation of the optical disc 1.

Figure 4:
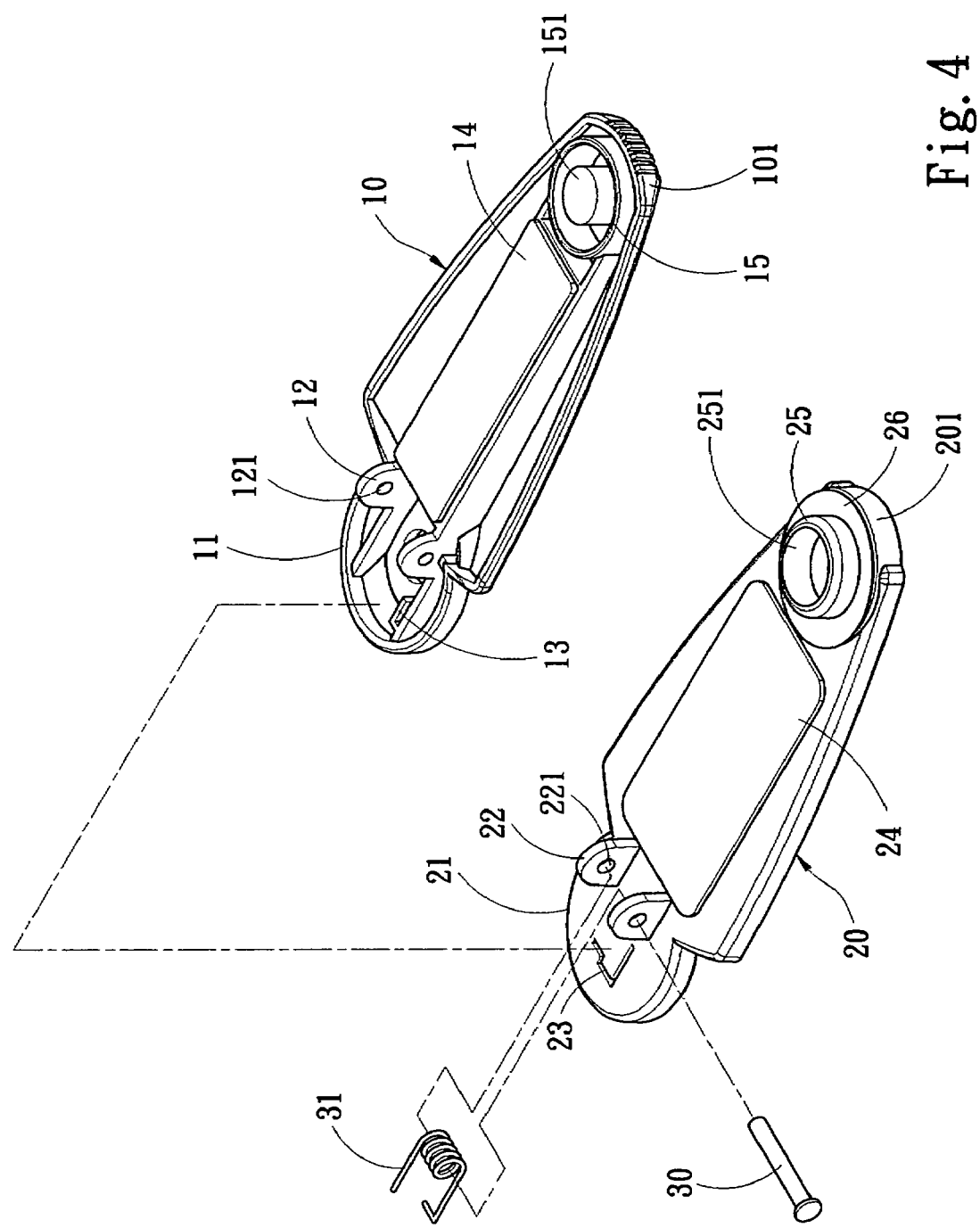
FIG. 4 is a diagram schematically showing the structure of the clamp-type optical disc repairing device according to a second preferred embodiment of the present invention.

Refer to FIG. 4 a diagram schematically showing the structure of the clamp-type optical disc repairing device according to a second preferred embodiment of the present invention. In this embodiment, the empty accommodation member 15 has a swab cloth 151, and the positioning convex member 25 has an empty portion 251 corresponding to the swab cloth 151. In the closed state, the empty portion 251 accommodates the swab cloth 151. After the user has swabbed or repaired the optical disc 1 via rotating the optical disc 1, he can use the swab cloth 151 to thoroughly clean the residual dust and dirt of the optical disc 1 taken out from the device.

The present invention is advantaged in its simple structure and superior portability, and users can carry about the device of the present invention conveniently; thus, they can swab or repair optical discs anywhere and anytime. In comparison with the conventional optical disc repairing devices in the market, the optical disc repairing disc of the present invention is lightweight and compact. Further, a rough material, such as an abrasive paper, may replace the contact pad 14 of a soft material to abrade and destroy the optical disc 1. After the data layer of the optical disc 1 has been scratched away, the optical disc 1 is no more readable. Therefore, the present invention is a dual-function device for repairing and destroying optical discs.

Those described above are only the preferred embodiments to clarify the present invention. However, it is not intended to limit the scope of the present invention, and any equivalent modification and variation according to the spirit of the present invention is to be also included within the scope of the present invention.

What is claimed is:

1. A clamp-type optical disc repairing device, used to clamp an optical disc with a central hole and then swab or repair said optical disc, and comprising:

a first clamp arm; and a second clamp arm, pivotally coupled to said first clamp arm via a coupling means, wherein force-applying ends are defined on the pivotal connection positions of said first clamp arm and said second clamp arm, and clamping ends are defined on the ends opposite to said force-applying ends; the inner side of said clamping end has a positioning convex member, and the inner side of said force-applying ends has an elastic element; the inner wall of said first clamp arm or said second clamp arm has at least one contact pad; the inner sides of said force-applying ends are compressed by said elastic element so that said clamping ends are normally closed; when an external is applied to said force-applying ends, said clamping ends are opened to form an open angle so that said optical disc can be placed in or taken out from the disposing space between said first clamp arm and said second clamp arm; said positioning convex member penetrates through said central hole of said optical disc, and said contact pad contacts the surface of said optical disc.

2. The clamp-type optical disc repairing device according to claim 1, wherein said coupling means further comprises: a first pivotal element and a second pivotal, which are respectively installed to said first clamp arm and said second clamp arm; said first pivotal element and said second pivotal element respectively have pivotal holes; a pivotal pin is inserted through said pivotal holes to form a pivotal coupling relationship between said first clamp arm and said second clamp arm.

3. The clamp-type optical disc repairing device according to claim 2, wherein said elastic element sleeves said pivotal pin, and said elastic element is a spring.

4. The clamp-type optical disc repairing device according to claim 3, wherein the inner sides of said first clamp arm and said second clamp arm respectively have accommodation slots for accommodating said elastic element.

5. The clamp-type optical disc repairing device according to claim 1, wherein said positioning convex member is installed in the inner side of said second clamp arm, and an empty accommodation member is installed in the inner side of said first clamp arm and corresponds to said positioning convex member, and said positioning convex member can be inserted into said empty accommodation member when said first clamp arm and said second clamp arm are closed.

6. The clamp-type optical disc repairing device according to claim 5, wherein said empty accommodation member has a swab cloth used to clean the surface of said optical disc, and said positioning convex member has an empty portion corresponding to said swab cloth, and said empty portion accommodates said swab cloth in the closed state.

7. The clamp-type optical disc repairing device according to claim 1, wherein a washer is installed along the perimeter of said positioning convex member.

8. The clamp-type optical disc repairing device according to claim 1, wherein a repair liquid may be applied onto said contact pad.

9. The clamp-type optical disc repairing device according to claim 1, wherein said contact pad is made of a rough material and used to abrade and destroy the surface of said optical disc.

* * * * *